(12) United States Patent
Lee et al.

(10) Patent No.: US 8,396,464 B2
(45) Date of Patent: Mar. 12, 2013

(54) METHOD AND APPARATUS FOR SOFTWARE UPDATE OF TERMINALS IN A MOBILE COMMUNICATION SYSTEM

(75) Inventors: Jong-Hyo Lee, Pyeongtaek-si (KR);
Sung-Oh Hwang, Yongin-si (KR);
Bo-Sun Jung, Seongnam-si (KR);
Ji-Eun Keum, Suwon-si (KR);
Byung-Rae Lee, Seoul (KR);
Kook-Heui Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 777 days.

(21) Appl. No.: 12/414,294

(22) Filed: Mar. 30, 2009

(65) Prior Publication Data

US 2009/0247145 A1 Oct. 1, 2009

(30) Foreign Application Priority Data

Mar. 28, 2008 (KR) .................. 10-2008-0029373

(51) Int. Cl.
*H04M 3/00* (2006.01)
(52) U.S. Cl. ..................... 455/419; 455/420
(58) Field of Classification Search .............. 455/418, 455/419, 420, 403, 550.1; 709/203, 207; 717/169, 173
See application file for complete search history.

(56) References Cited

U.S. PATENT DOCUMENTS

| | | | |
|---|---|---|---|
| 5,619,250 A | 4/1997 | McClellan et al. | |
| 6,469,742 B1 | 10/2002 | Trovato et al. | |
| 6,535,743 B1 * | 3/2003 | Kennedy et al. | 455/456.1 |
| 6,771,609 B1 * | 8/2004 | Gudat et al. | 370/254 |
| 6,889,032 B2 * | 5/2005 | Dao et al. | 455/11.1 |
| 7,877,778 B2 | 1/2011 | Hamada | |
| 2005/0050538 A1 * | 3/2005 | Kawamata et al. | 717/168 |
| 2006/0030312 A1 * | 2/2006 | Han et al. | 455/432.1 |
| 2006/0264206 A1 * | 11/2006 | Itaba et al. | 455/414.3 |
| 2007/0093202 A1 * | 4/2007 | Hwang et al. | 455/3.06 |
| 2007/0121821 A1 * | 5/2007 | Su | 379/88.13 |
| 2009/0172419 A1 * | 7/2009 | Takayama | 713/193 |
| 2009/0265700 A1 * | 10/2009 | Lee et al. | 717/169 |
| 2010/0131642 A1 * | 5/2010 | Chalikouras et al. | 709/224 |
| 2011/0023070 A1 * | 1/2011 | Vare et al. | 725/62 |
| 2011/0093516 A1 * | 4/2011 | Geng et al. | 707/827 |

FOREIGN PATENT DOCUMENTS

| | | |
|---|---|---|
| CN | 1933440 | 3/2007 |
| CN | 1956585 | 5/2007 |
| JP | 2004-023584 | 1/2004 |

(Continued)

OTHER PUBLICATIONS

Mobile Broadcast Services Architecture, Candidate Version 1.0, Open Mobile Alliance, OMA-AD-BCAST-V1_0-20080226-C, Feb. 26, 2008.

*Primary Examiner* — Cong Tran
(74) *Attorney, Agent, or Firm* — The Farrell Law Firm, P.C.

(57) ABSTRACT

A method of updating software of terminals in a mobile broadcast system is provided. The method includes creating an update command for terminals of a particular model, the update command including update information; and broadcasting the created update command. The update information includes software version information and at least one of terminal manufacturer information and terminal model information. Further, the method may further include, before broadcasting the created update command, forcibly requiring terminals subscribe to an update service; and creating and broadcasting an update file for terminals of the particular model from among the forcibly subscribed terminals. The software of the terminals may be firmware.

25 Claims, 4 Drawing Sheets

FOREIGN PATENT DOCUMENTS

| | | |
|---|---|---|
| JP | 2007-079951 | 3/2007 |
| JP | 2009-159470 | 7/2009 |
| KR | 1020030063694 | 7/2003 |
| KR | 100693593 | 3/2007 |
| KR | 1020070034368 | 3/2007 |
| WO | WO 2006/080804 | 8/2006 |

\* cited by examiner

METHOD AND APPARATUS FOR SOFTWARE UPDATE OF TERMINALS IN A MOBILE COMMUNICATION SYSTEM

PRIORITY

This application claims priority under 35 U.S.C. §119(a) to an application entitled "Method And Apparatus For Software Update of Terminals In A Mobile Communication System" filed in the Korean Industrial Property Office on Mar. 28, 2008 and assigned Serial No. 10-2008-0029373, the contents of which are incorporated herein by reference.

BACKGROUND OF THE INVENTION

1. Field of the Invention

The present invention relates generally to a mobile broadcast system supporting a BroadCAST service (BCAST), and more particularly to a method and an apparatus for updating software or firmware of mobile broadcast terminals through a mobile broadcast system.

2. Description of the Related Art

The mobile communication market has continuously met requirements for the production of a new service through the recombination or unification of existing technologies. Further, with the development of communication and broadcast technologies, current broadcast systems or mobile communication systems is in the stage of providing a broadcast service through a portable terminal, i.e., a mobile terminal, such as a mobile phone or a Personal Digital Assistant (PDA), in a conventional broadcast system or mobile communication system. In addition to the above-described potential and actual market demands, rapidly increasing user demands for multimedia services, enterprisers' strategy to provide new services such as a broadcast service beyond existing voice services, and interests of Information Technology (IT) companies that are enhancing mobile communication businesses in response to consumers' demands have enabled the convergence between mobile communication services and Internet Protocol (IP) to create a big stream in the development of next generation mobile communication technology. This convergence has induced the introduction and application of various wireless communication and broadcast services into the wired communication market as well as the mobile communication market. Such an omni-directional convergence has created a common consumption environment for various services regardless of whether the services are wired, wireless, or broadcast.

Meanwhile, the Open Mobile Alliance (OMA), which is an organization studying standards for interaction between individual mobile solutions, has determined standards for various applications relating to mobile games, Internet services, etc. Among working groups of the OMA, the OMA BCAST mobile broadcast working group is studying technology standards for providing a broadcast service by using a mobile terminal. OMA BCAST standardizes technologies for providing an IP-based broadcast service in a mobile terminal environment, such as a service guide, downloading and streaming transmission technology, service and content protection technology, service subscription, and roaming.

With the market trend of synthetic service provisions caused by the convergence between wire and wireless environments, mobile broadcast technologies, such as OMA BCAST, are expected to evolve to a level capable of providing services in wired/wireless united environments beyond the mobile environment.

The following description is based on the OMA BCAST mobile broadcast technology standard, as an example.

FIG. 1 illustrates a logical structure of the BCAST working group of the OMA for establishing technology standards of an application layer of a mobile broadcast service and sub-layers thereof up to the transport layer.

First, logical entities shown in FIG. 1 are described as follows. A content provider or Content Creation (CC) entity 101 provides content, which is the basis for the BCAST service and includes a file for a typical broadcast service, including data for a movie, audio data, and video data. Further, the CC entity 101 provides a BCAST Service Application (BSA) entity 102 with an attribute of the content for generating a service guide and determining a transport bearer for the transmission of the service.

The BSA entity 102 receives data of the BCAST service from the CC entity 101, and converts the data into a proper format for media encoding, content protection, interactive service provision, etc. Further, the BSA entity 102 provides the attribute of the content supplied from the CC entity 101 to a BCAST Service Distribution/Adaptation (BSDA) entity 103 and a BCAST Subscription Management (BSM) entity 104.

The BSDA entity 103 performs various tasks including file and streaming transmission, service collection, service protection, service guide creation and delivery, and service notification, through use of the BCAST service data supplied from the BSA 102 entity. Further, the BSDA entity 103 adjusts the service to be compatible with a broadcast distribution system 112.

The BSM entity 104 manages service regulation, which includes subscription and charge-related functions of a BCAST service user, regulation of information used for the BCAST service, and regulation of a terminal receiving the BCAST service through hardware or software.

The terminal 105 receives content and program support information such as service guide and content protection information, and provides a user with a broadcast service. The BDS Service Distribution entity 111 transmits a mobile broadcast service to multiple terminals through inter-communication with the broadcast distribution system 112 and an interaction network 113.

The broadcast distribution system 112 transmits a mobile broadcast service through a broadcast channel, such as Multimedia Broadcast Multicast Service (MBMS) of the 3rd Generation Project Partnership (3GPP), Broadcast Multicast Service (BCMCS) of 3rd Generation Project Partnership 2 (3GPP2), which is the $3^{rd}$ generation synchronous mobile communication standards organization, and DVB-Handheld (DVB-H) or Internet Protocol (IP)-based broadcast/communication network of Digital Video Broadcasting (DVB), which is a digital broadcast standards organization. The interaction network 113 provides an interactive channel, such as a cellular network, for example.

Next, reference points, which are connection paths between the logical entities, are described as follows. Each of the reference points has multiple interfaces according to various purposes, which are used for communication between at least two logical entities for predetermined purposes and have message types of protocols applied to them for the purposes.

In FIG. 1, the BCAST-1 121 is a transmission path for content and a content attribute, and the BCAST-2 122 is a transmission path for a content-protected or content-unprotected BCAST service, an attribute of the BCAST service, and a content attribute.

The BCAST-3 123 is a transmission path for an attribute of a BCAST service, a content attribute, user preference and subscription information, a user request, and a response to the user request. The BCAST-4 124 is a transmission path for a notification Message, an attribute used for a service guide, and a key used for content Protection and service protection. The BCAST-5 125 is a transmission path for security materials, such as a Digital Right Management Right Object (DRM RO) and a key value, which are used for a protected BCAST service, an unprotected BCAST service, a content-protected BCAST service, a content-unprotected BCAST service, a BCAST service attribute, a content attribute, a notification, a service guide, and BCAST service protection, and all data and signals transmitted through the BCAST channel.

The BCAST-6 126 is a transmission path for security materials, such as a DRM RO and a key value, which are used for a protected BCAST service, an unprotected BCAST service, a content-protected BCAST service, a content-unprotected BCAST service, a BCAST service attribute, a content attribute, a notification, a service guide, and BCAST service protection. All data and signals transmitted through an interaction channel.

The BCAST-7 127 is a transmission path for user preference information transmitted through an interaction channel of control information relating to reception of security materials, such as a DRM RO and a key value, used for service provisioning, subscription information, device management, and BCAST service protection. The BCAST service comes into interaction with the transmission path BCAST-8 128. The BDS-1 129 is a transmission path for security materials, such as a DRM RO and a key value, used for a protected BCAST service, an unprotected BCAST service, a BCAST service attribute, a content attribute, a notification, a service guide, and BCAST service protection.

The BDS-2 130 is a transmission path for security materials, such as a DRM RO and a key value, used for providing services, subscription information, device management, and BCAST service protection. The X-1 131 is a reference point between the BDS service distribution entity 111 and the broadcast distribution system 112. The X-2 132 is a reference point between the BDS service distribution entity 111 and the interaction network 113. The X-3 133 is a reference point between the broadcast distribution system 112 and the terminal 105. The X-4 134 is a reference point between the BDS service distribution entity 111 and the terminal 105 through a broadcast channel. The X-5 135 is a reference point between the BDS service distribution entity 111 and the terminal 105 through an interaction channel. The X-6 136 is a reference point between the interaction network 113 and the terminal 105.

Meanwhile, in regard to the Open Mobile Alliance Device Management (OMA DM), the exponential increase in the number of mobile terminals has caused a necessity for a standardized method for management of mobile devices, and has thus resulted in development of a mobile terminal management method that enables a mobile enterpriser or service provider to manage firmware or software of terminals while performing wireless communication with the terminals. The OMA DM can manage firmware or software within a mobile terminal by reading, adding, changing, or executing an object of the mobile terminal by using its own a DM protocol standardized by the OMA DM, which is called "terminal provisioning service."

According to one kind of the terminal provisioning service, the terminals can use the latest software and can more stably and efficiently operate only after updating firmware periodically provided by a manufacturer of the terminals, in a manner similar to other typical mobile terminals.

The OMA DM is designed for use within a terminal of a mobile communication system, and thus allows all communications to be interactive. However, although there are not many models of terminals that use services provided by a single provider, there are still many other terminals that use the services provided by a single provider. Therefore, the OMA DM is very ineffective, since the OMA DM requires a very large quantity of resources when the firmware update of each terminal is interactively performed one-to-one. Therefore, there is a need for a method of simultaneously and collectively updating the same type of multiple terminals through a broadcast system, such as BCAST.

SUMMARY OF THE INVENTION

The present invention has been made to address the above-mentioned problems and/or disadvantages and to provide at least the advantages described below. Accordingly, an aspect of the present invention provides a method and an apparatus for updating software of terminals of a particular model in a mobile broadcast system.

The present invention further provides a method and an apparatus for efficient firmware update of terminals, which can simultaneously update firmware of the same type of multiple terminals through broadcast.

The present invention further provides a method and an apparatus for providing a provisioning update service to terminals by using a notification message in a mobile broadcast system.

According to one aspect of the present invention, a method of updating software of terminals in a mobile broadcast system is provided. The method includes creating an update command for terminals of a particular model, the update command including update information; and broadcasting the created update command. The update information includes software version information and at least one of terminal manufacturer information and terminal model information. Further, the method may further include, before broadcasting the created update command, requiring terminals subscribe to an update service; and creating and broadcasting an update file for terminals of the particular model from among the forcibly subscribed terminals. The software is firmware of the terminals.

According to another aspect of the present invention, a method of updating software in a terminal of a mobile broadcast system is provided. The method includes receiving an update command for terminals of a particular model through a broadcast, the update command including update information; and determining whether to update the software based on the update information. The update information includes software version information and at least one of terminal manufacturer information and terminal model information. The method may further include, before receiving the update command through the broadcast, receiving an update service forced subscription command from the network; and subscribing to the update service. When it is determined that an update of the software is to be performed, an update file is received through the broadcast and the update is performed by using the received update file. The software is firmware of the terminal.

According to another aspect of the present invention, a network apparatus for updating software of terminals in a mobile broadcast system is provided. The network apparatus includes a BroadCAST (BCAST) Subscription Management (BSM) for transmitting an update command for terminals of a particular model, the update command including update information; and a Broadcast Service Distribution System (BSDA) for receiving and broadcasting the transmitted update command. The update information includes software version information and at least one of terminal manufacturer information and terminal model information.

The BSM includes a Terminal Provisioning-Management (TP-M) for requesting creation of an update notification message and a NoTification-Generation (NTG) for creating the update notification message in response to the request from the TP-M and transmitting the created update notification message to the BSDA, and the BSDA receives and broadcasts the update notification message. The BSM includes a Service Guide-Subscription Source (SG-SS) and a TP-M for requesting the SG-SS to create an update service, the SG-SS creates an update service fragment creation request message including information necessary for creation of an update service fragment in response to a request from the TP-M and transmits the created update service fragment creation request message to the BSDA, and the BSDA creates and broadcasts un update service fragment including an update service auto-subscription command by using the information necessary for creation of the update service fragment. The BSM further includes a BCAST Service Provisioning-Management (BSP-M) for receiving the update service subscription request from terminals, the TP-M requests creation of a content fragment for an update file for the terminals of the particular model and transmits the update file to the BSDA, the SG-SS receives the request for creation of the content fragment and transmits information necessary for creation of the content fragment, and the BSDA creates the content fragment by using the necessary information received from the SG-SS and broadcasts the created content fragment and the update file received from the TP-M. The software is firmware of the terminals.

According to another aspect of the present invention, an apparatus for software update in a terminal of a mobile broadcast system is provided. The apparatus includes a NoTification-Client (NTC) receiving an update command for terminals of a particular model through a broadcast and determining whether to update the software based on the update information, the update command including update information. The update information includes software version information and at least one of terminal manufacturer information and terminal model information. The apparatus may further include a Service Guide-Client (SG-C) for receiving an update service forced subscription command through the broadcast; and a BCAST Service Provisioning-Client (BSP-C) for subscribing to the update service according to the update service forced subscription command. When update of the software is determined, the NTC receives a content fragment and an update file, and the terminal further includes a File Delivery-Client (FD-C) for receiving the received update file from the NTC and a Terminal Provisioning-Client (TP-C) for receiving the update file from the FD-C and performing the update. The software is firmware of the terminal.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF THE PREFERRED EMBODIMENTS

Figure 1:
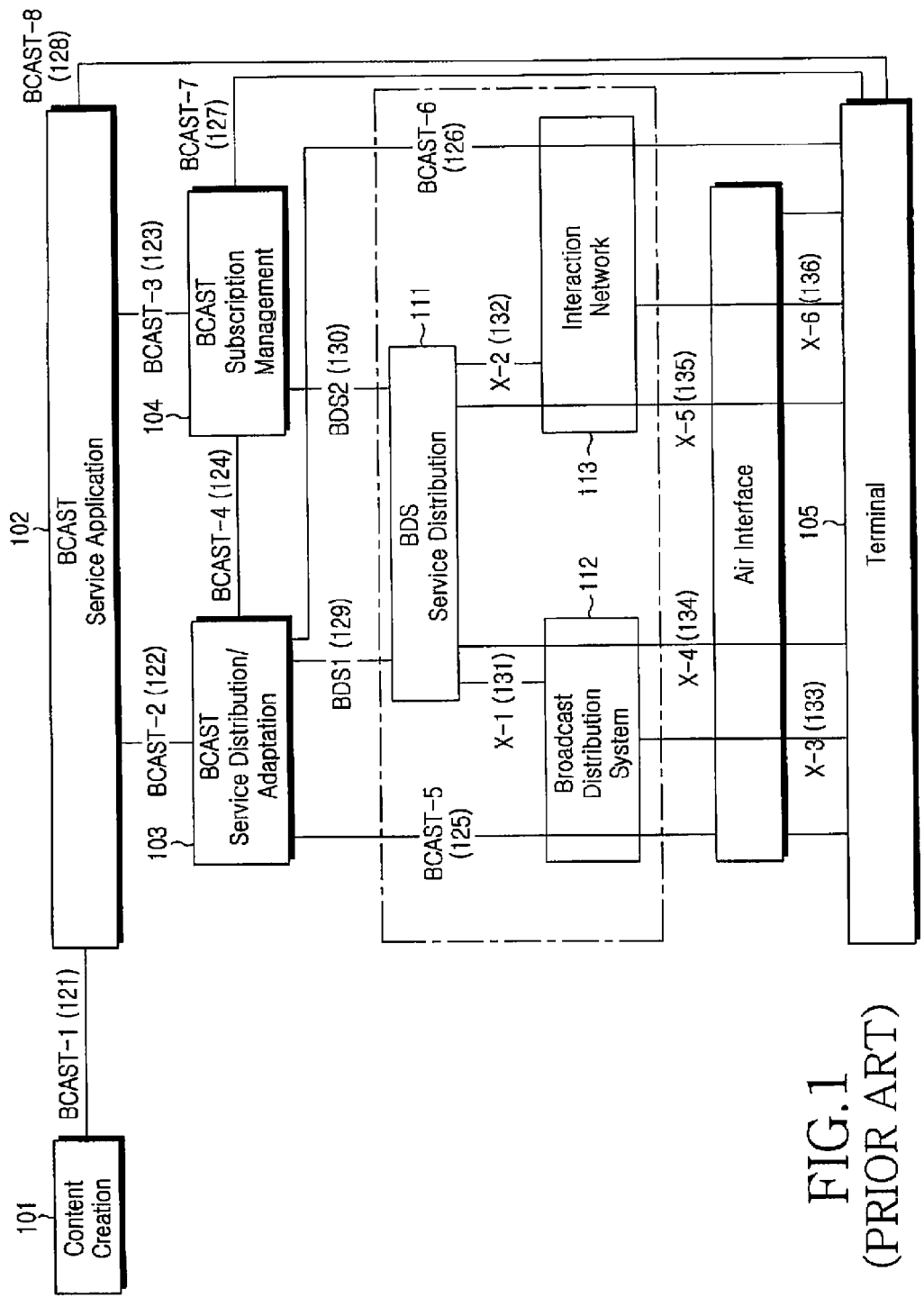
FIG. 1 is a diagram illustrating a logical structure of a service guide function in the OMA BCAST.

Preferred embodiments of the present invention are described in detail with reference to the accompanying drawings. In the following description, the same or similar elements will be designated by the same reference numerals although they are shown in different drawings.

Further, various specific definitions found in the following description are provided only to help general understanding of the present invention, and it is apparent to those skilled in the art that the present invention can be implemented without such definitions. Further, detailed descriptions of constructions or processes known in the art may be omitted to avoid obscuring the subject matter of the present invention.

The following description will employ the same names of the entities defined in the 3rd Generation Project Partnership (3GPP), which is an asynchronous mobile communication standard organization, or BCAST of the Open Mobile Alliance (OMA), which is an organization for standards of applications of mobile terminals. However, such standards and names do not limit the scope of the present invention, which can be naturally applied to other similar systems.

Figure 2:
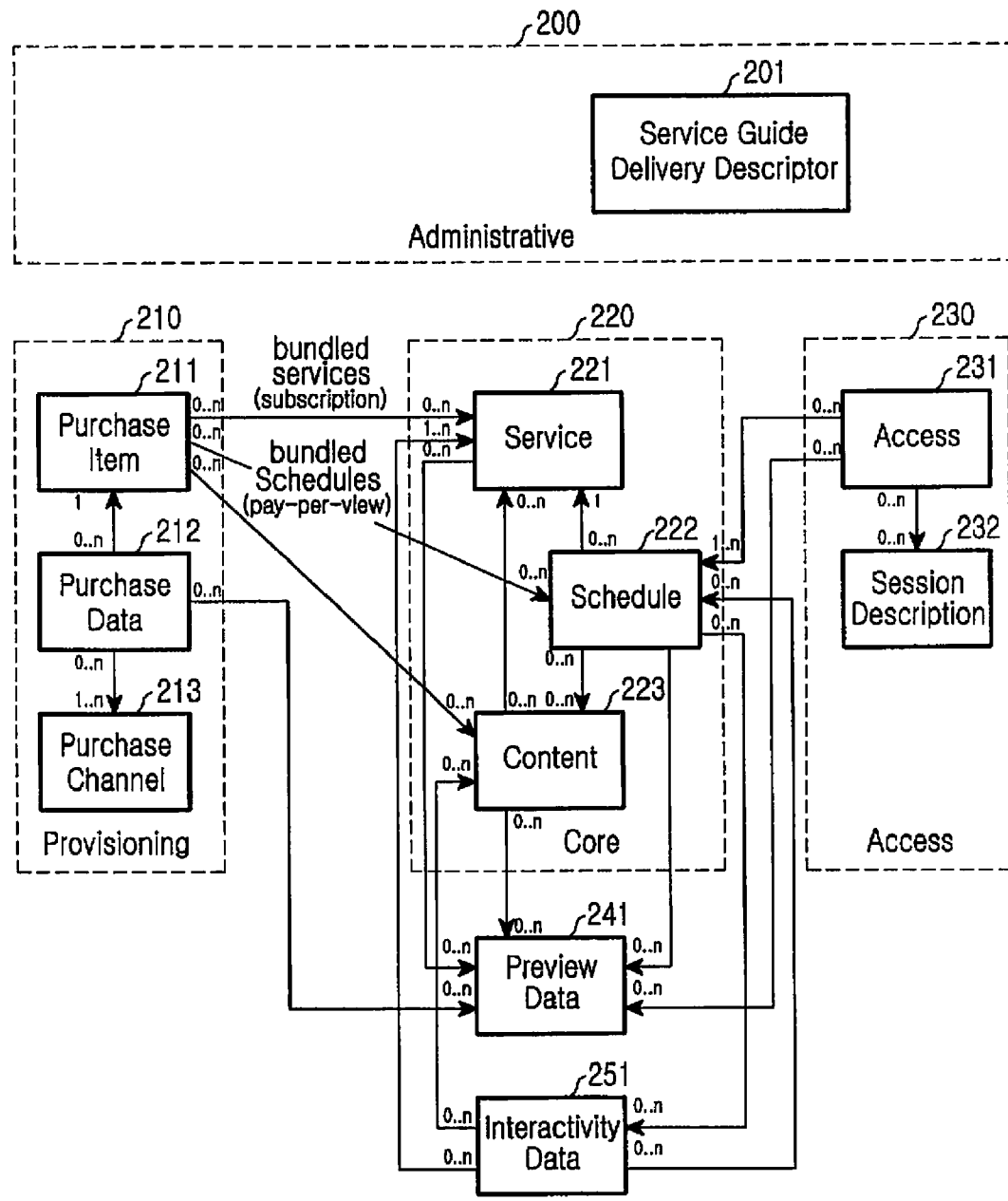
FIG. 2 is a diagram illustrating a data model for creation of a service guide within an OMA BCAST system, which is a mobile broadcast system according to the present invention.

FIG. 2 illustrates a data model for creation of a service guide within an OMA BCAST system, which is a mobile broadcast system according to the present invention. The configuration shown in FIG. 2 is a configuration proposed for providing a broadcast service to terminals by a BCAST system.

The service guide includes general information on the broadcast configuration. The terminal receives the service guide and acquires broadcast information from the service guide, and a user determines whether to receive the broadcast by using the broadcast information. For example, in order to receive a broadcast, the user must acquire information regarding broadcast services included in a broadcast system, information on programs included in each broadcast service, and schedule information for the broadcasting of each program, and such information as described may be included in the service guide.

To this end, in the OMA BCAST, one service guide includes fragments, each of which has its own purpose. For example, one service guide may include a fragment including information on a broadcast channel, a fragment including information on a program, and a fragment including information such as the broadcast time of the programs, which are separately configured.

FIG. 2 illustrates fragments included in a service guide of the OMA BCAST. Each of the entities enclosed by the thickened solid lines indicates one fragment. Meanwhile, the fragments may be bundled into groups based on similarities between the respective purposes of the fragments. The fragment groups are indicated by broken lines. Further, solid lines interconnecting the fragments refer to inter-reference between the fragments.

Referring to FIG. 2, the service guide includes an administrative group 200 providing higher configuration information of the general service guide, a core group 220, which is a core part of the service guide, such as service, contents, and schedule, an access group 230 providing access information enabling access to a service or contents, a provisioning group 210 including subscription and purchase information, a preview data fragment 241, and an interactivity data fragment 251.

The administrative group 200 includes a service guide delivery descriptor fragment 201. The provisioning group 210 includes a purchase item fragment 211, a purchase data fragment 212, and a purchase channel fragment 213.

The core group 220 includes a service fragment 221, a schedule fragment 222, and a content fragment 223. The access group 230 includes an access fragment 231 and a session description fragment 232.

The functions of the fragments are described as follows. The service guide delivery descriptor fragment 201 includes delivery session information including a location of a Service Guide Delivery Unit (SGDU) containing fragments of the service guide, and information on an entry point for receiving a notification message and grouping information for the SGDU. Further, it is possible to provide preview information on the service, schedule, and contents through the preview fragment 241. Alternatively, it is also possible to provide an interactive service during broadcast according to the corresponding service, schedule, and contents through the interactive fragment 251.

The service fragment 221 includes information of service contents, genre, service area, etc. as higher collections of the contents included in the broadcast service around the general service guide. The schedule fragment 222 indicates time information of each of the contents included in the services such as streaming and downloading. The Content fragment 223 includes a detailed description of the broadcasted content, a target user group, a service area, and genre.

The access fragment 231 provides access-related information that enables a user to see the service, and provides a delivery method for a corresponding access session, session information, etc. The session description fragment 232 may be included in the access fragment 231, which notifies location information in the form of a URI so that the terminal can identify information of a corresponding session description fragment 232. The session description fragment 232 provides codec information and address information of multimedia contents existing in a corresponding session.

The purchase item fragment 211 provides a bundle including service, contents, time, etc., thereby helping the user to subscribe or purchase a corresponding purchase item fragment 211. The purchase data fragment 212 includes detailed information relating to the purchase and subscription, such as price information of a service or service bundle as well as promotion information. The purchase channel fragment 213 notifies access information for subscription or purchase.

Detailed information on the service guide may be defined through various element values and attribute values for providing detailed contents and values based on the higher data model of FIG. 2.

Further, although detailed element values and attribute values for each fragment of the service guide are not described herein, the detailed element values and attribute values described above do not limit the present invention. Further, the present invention is applicable to all the element values and attribute values defined according to the necessity in providing the service guide for a mobile broadcast service.

A message schema table used in the present invention will be described with reference to Table 1 below.

TABLE 1

| Name | Type | Category | Cardinality | Description | Data type |
| --- | --- | --- | --- | --- | --- |

In Table 1, "Name" refers to names of element values and attribute values of a concerned message. The "Type" refers to which type a concerned name corresponds to, which includes the element value and the attribute value. The element values include values, such as E1, E2, E3, and E4, wherein E1 refers to a super-element value of the entire message, E2 refers to a sub-element value of E1, E3 refers to a sub-element value of E2, and E4 refers to a sub-element value of E3. The attribute value is expressed by A, which indicates an attribute value of a concerned element.

For example, A under E1 indicates an attribute value of E1. The "Category" field is used in order to indicate whether a concerned element value or attribute value is indispensable or optional. The "Category" field has an M value when a concerned element value or attribute value is indispensable, and has value when the concerned element value or attribute value is optional. The "Cardinality" field further indicates the relation between elements and has a value of 0, 0 . . . 1, 1, 0 . . . n, or 1 . . . n, wherein 0 refers to an optional relation, 1 refers to an indispensable relation, and n refers to the possibility of having multiple values. For example, "0 . . . n" implies that either no concerned element values exist or n values exist.

The "Description" field indicates the meaning of a concerned element or attribute value, and the "Data Type" field indicates the data type of a concerned element or attribute value.

Figure 3:
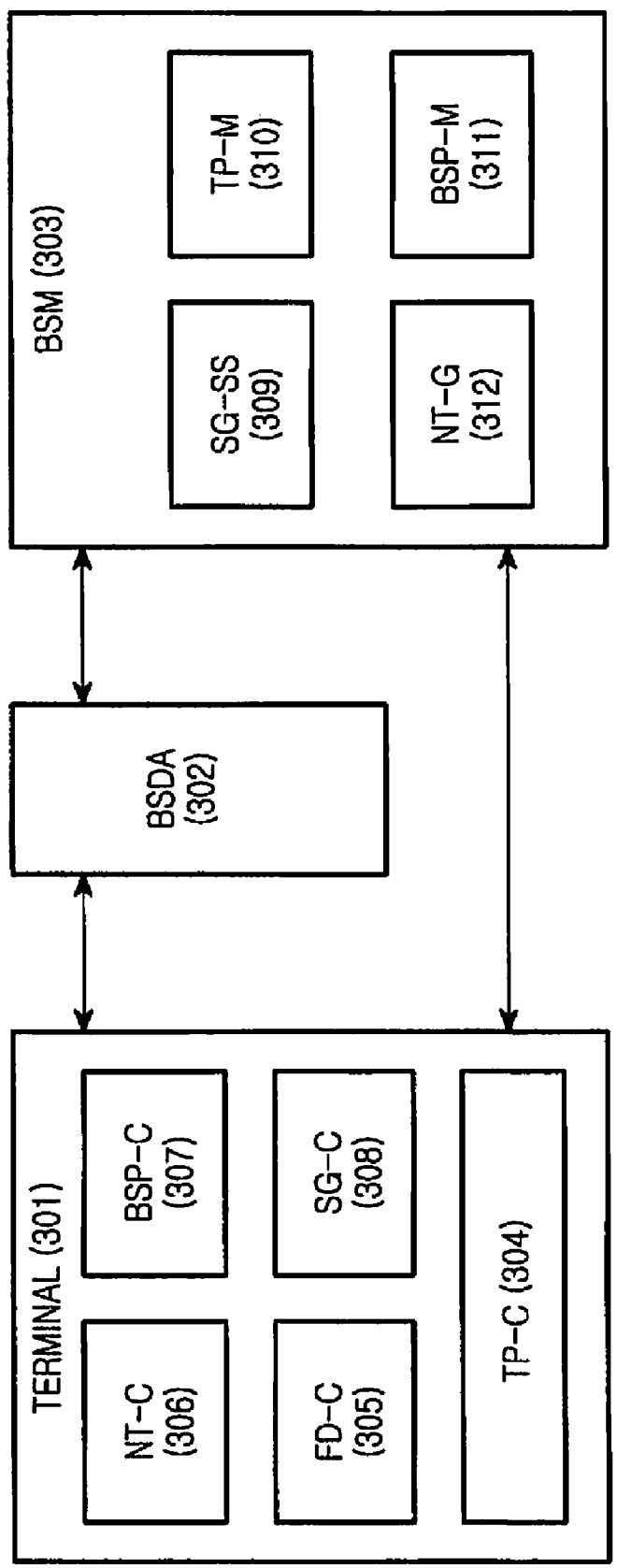
FIG. 3 is a block diagram illustrating an apparatus structure according to an embodiment of the present invention.

FIG. 3 is a block diagram illustrating an apparatus structure according to an embodiment of the present invention. The apparatus structure diagram proposed by the present invention includes logical entities necessary for the present invention and functions of the entities, further to the existing BCAST structure diagram.

The terminal 301, the BSDA 302, and the BSM 303 of FIG. 3 are similar to the terminal 105, the BSDA 103, and the BSM 104, respectively, and, in addition, have the following functions.

The terminal 301 includes a Terminal Provisioning-Client (TP-C) 304, a File Delivery-Client (FD-C) 305, a NoTification-Client (NT-C) 306, a BACST Service Provisioning-Client (BSP-C) 307, and a Service Guide-Client (SG-C) 308.

The TP-C 304 performs a terminal provisioning function through a terminal provisioning message received by the terminal 301. The TP-C 304 performs functions of the terminal side in the OMA DM described above, and manages firmware of a terminal in the present invention. The FD-C 305 receives a firmware file delivered through a broadcast in the terminal 301, and the NT-C 306 receives a notification message through a broadcast, identifies contents of the notification message, and controls other function blocks within the terminal 301 to follow indications of the notification message. The BSP-C 307 subscribes to a service provided by the BCAST and performs a report function relating to use of the service. The SG-C 308 processes the service guide information received by the terminal 301 so that a user or the terminal 301 can use the processed information.

The BSM 303 includes the following components. The Service Guide-Subscription Source (SG-SS) 309 provides information including service provisioning and terminal provisioning necessary for the service guide, service purchase, and service subscription.

The Terminal Provisioning-Management (TP-M) 310 manages a terminal provisioning function. To this end, the TP-M 310 generates a terminal provisioning message to be transmitted to the terminal 301. Further, as described above, the TP-M 310 performs functions of the server side in the OMA DM, and manages firmware of a terminal according to the present invention.

The BCAST Service Provisioning-Management (BSP-M) 311 performs functions of subscription management and purchase/charge management for the BCAST service. The Notification-Generation (NT-G) 312 receives requests from multiple BCAST entities and generates a notification message to be transmitted to the terminal 301 in response to the requests. Specifically, the NT-G 312 generates a notification message for the user and a system notification message for service management.

Figure 4:
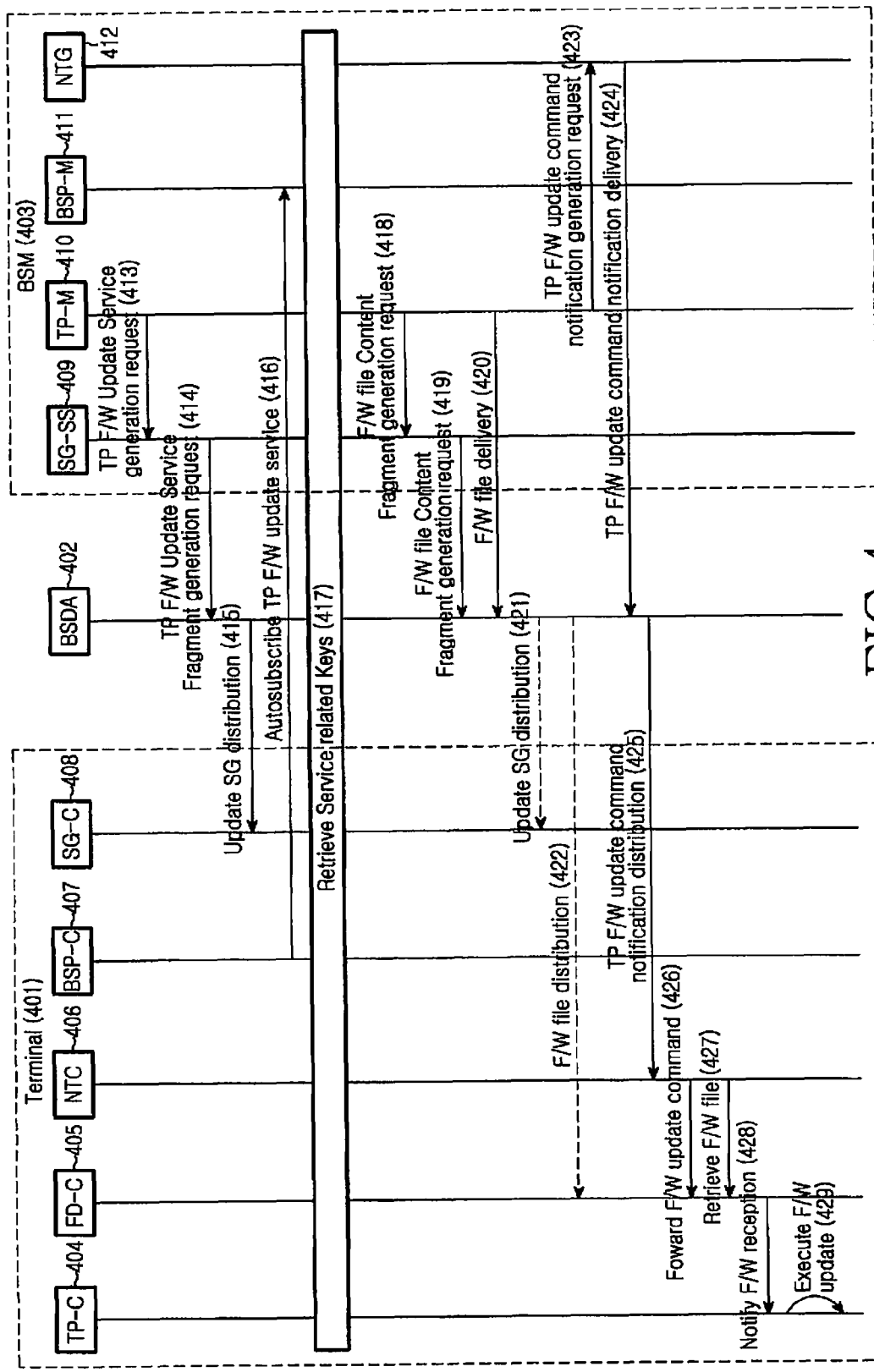
FIG. 4 is a message flow diagram according to an embodiment of the present invention.

FIG. 4 is a message flow diagram according to an embodiment of the present invention.

First, logical entities and their functions 401 to 412 in the message flow diagram of FIG. 4 are identical to the logical entities and their functions 301 to 312 of FIG. 3.

The process illustrated in FIG. 4 includes five stages described as follows.

The first stage includes steps 413 to 416 for forcibly controlling terminals to subscribe to a terminal provisioning update service (hereinafter, briefly referred to as "update service") for firmware update. Since conventional firmware updates are individually performed for each terminal, the determination of whether to perform the firmware update depends on the terminal user's intention. However, according to the present invention, all terminals are forcibly made to subscribe to the update service so that firmware update is performed regardless of the users' intention.

In step 413, when a firmware update is necessary for terminals, the TP-M 410 requests the SG-SS 409 to create an update service in order to provide the update service to the terminals. Upon receiving the request for creation of the update service, the SG-SS 409 sends a request to the BSDA 402 for creation of an update service fragment for the update service in step 414.

Meanwhile, the message sent from the SG-SS 409 to the BSDA 402 for requesting creation of the update service fragment in step 414 corresponds to a delivery message defined in the BCAST shown in Tables 2a to 2b below. To this end, information necessary for creation of the update service fragment is added to the delivery message, which is indicated in the body element of Table 2b below.

In the meantime, the SG-SS 409 itself may create the update service fragment and deliver the update service fragment to the BSDA 402, i.e., "terminal provisioning service fragment" is added to the "type" element of Table 2b. The type element of the delivery message is conventionally used in order to notify the usage of a concerned delivery message. In the present invention, by adding a terminal provisioning service fragment to the type element, the BSDA 402 is notified of establishment of the terminal provisioning service.

Tables 2a to 2b below are divided from one Table for convenience and actually configure a single table.

TABLE 2a

| Name | Type | Category | Cardinality | Description | Data Type |
|---|---|---|---|---|---|
| SGDelivery | E | | | Specifies the delivery message of Service Guide data over interface SG-4 which is used for generating Service Guide in SG-G. Contains the following elements: BSMSelector BSMSelectorID SGData PrivateExt | |
| BSMSelector | E1 | M | 0 . . . N | This element provides the details on the visibility of the enclosed 'SGData'. All the 'BSMSelectorID' values used in the request SHALL have one and only one of these 'BSMSelector' elements instantiated with matching identifier. Element 'BSMSelector' is specified in section 5.4.1.5.2. | Complex Type |
| BSMSelectorID | E1 | M | 0 . . . N | This element represents constraints on the visibility of the all enclosed 'SGData' elements. This identifier corresponds to the 'id' attribute of the 'BSMSelector' element. See the corresponding description in the 'SGDD' for more details. | anyURI |
| SGData | E1 | M | 1 . . . N | Contains source information to be included into the Service Guide. It is RECOMMENDED that the information is delivered in the form of BCAST Service Guide fragments. Contains the following attributes: id transportID version validFrom validTo encoding type Contains the following element: Body | |
| id | A | M | 0 . . . 1 | Identifier of the data enclosed in element 'Body'. See also the description of the 'id' attribute in the 'SGDeliveryRes' message. | anyURI |
| transportID | A | O | 0 . . . 1 | Transport identifier of the data enclosed in element 'Body'. | unsignedLong |
| version | A | M | 1 | Version of the data enclosed in element 'Body'. | unsignedInt |

TABLE 2b

| validFrom | A | M | 1 | Start time of the validity of the data enclosed in element 'Body'. | unsignedInt |
|---|---|---|---|---|---|
| validTo | A | M | 1 | End time of the validity of the data enclosed in element 'Body'. | unsignedInt |

TABLE 2b-continued

| | | | | | |
|---|---|---|---|---|---|
| encoding | A | M | 1 | Fragment encoding type of the data enclosed in element 'Body'.<br>0 - XML encoded OMA BCAST Service Guide fragment<br>1 - SDP<br>2 - MBMS User Service Bundle Description (MBMS-USBD) as specified in [3GPP TS 26.346] section 5.2.2. It may contain one or more SDP descriptions.<br>3 - AssociatedDeliveryProcedure for File and Stream Distribution as specified in [BCAST10-Distribution] section 5.3.4<br>4 - 127 Reserved for future use<br>128-255 Reserved for proprietary use | unsignedByte |
| type | A | M | 0 ... 1 | Fragment encoding type of the data enclosed in element 'Body'. This SHALL be present and set to one of the values listed below f the 'Body' contains a Service Guide XML fragment and the value of 'encoding' is set to '0'.<br>5 - PurchaseItem Fragment<br>6 - PurchaseData Fragment<br>7 - PurchaseChannel Fragment<br>8 - Terminal Provisioning Service Fragment | unsignedByte |
| Body | E2 | M | 1 | Contains the delivered Service Guide data. The value SHALL be an instance of 'PurchaseItem', 'PurchaseData', 'PurchaseChannel' or 'Service' element as specified in 5.1.2.6, 5.1.2.7 and 5.1.2.8 of [BCAST10-SG]. | complexType |
| PrivateExt | E1 | O | 0 ... 1 | An element serving as a container for proprietary or application-specific extensions. | |
| <proprietary elements> | E2 | O | 0 ... N | Proprietary or application-specific elements that are not defined in this specification. These elements may further contain sub-elements or attributes. | |

Upon receiving the request for creation of a terminal provisioning service fragment in step 414, the BSDA 402 creates a service fragment as shown in Tables 3a and 3b below by using information provided through the body element, etc. of the delivery message. According to the present invention, an element named "AutoSubscribe" is added to the existing service fragment. The AutoSubscribe element is an element that requires the terminal 401 to subscribe to the update service. Tables 3a and 3b below show a construction of a service fragment according to an embodiment of the present invention. When the BSDA 402 sets the "ServiceType" included in the Description element of Table 3a below to a predetermined value, the terminal can determine from the set value that the types of the service to which a concerned terminal should subscribe are an update service and a notification service. In the present invention, since the update service is implemented by using the notification service, the terminal is required to subscribe to the notification service together with the update service, in order to provide the update service to the terminal.

Tables 3a and 3b below are divided from one table for convenience and actually configure a single table.

TABLE 3a

| Name | Type | Category | Cardinality | Description | Data Type |
|---|---|---|---|---|---|
| Service | E | | | 'Service' fragment<br>Contains the following attributes:<br>id<br>version<br>validFrom<br>validTo<br>globalServiceID<br>weight<br>serviceContentProtection<br>baseCID<br>emergency<br>Contains the following elements:<br>ProtectionKeyID<br>ServiceType<br>Name<br>Description<br>AudioLanguage<br>TextLanguage<br>ParentalRating<br>TargetUserProfile<br>Genre<br>Extension<br>PreviewDataReference<br>BroadcastArea<br>TermsOfUse<br>PrivateExt | |
| | id | A | NM/TM | 1 | ID of the 'Service' fragment. The value of this attribute SHALL be globally unique." | anyURI |
| | version | A | NM/TM | 1 | Version of this fragment. The newer version overrides the older one starting from the time specified by the 'validFrom' attribute, or as soon as it has been received if no 'validFrom' attribute is given. This field contains the 32 bits integer part of an NTP time stamp. | unsignedInt |

TABLE 3b

| | | | | | |
|---|---|---|---|---|---|
| validFrom | A | NM/TM | 0...1 | The first moment when this fragment is valid. If not given, the validity is assumed to have started at some time in the past. This field contains the 32 bits integer part of an NTP time stamp. | unsignedInt |
| validTo | A | NM/TM | 0...1 | The last moment when this fragment is valid. If not given, the validity is assumed to end in undefined time in the future. | unsignedInt |
| globalServiceID | A | NM/TM | 0...1 | The globally unique identifier identifying the service this 'Service' fragment describes. syncopation | anyURI |
| PreviewDataIDRef | E2 | NO/TM | 0...N | Reference to the 'PreviewData' fragment which carries the representation of Terms of Use. If this element is not present, the 'TermsOfUseText' SHALL be present. | anyURI |
| TermsOfUseText | E2 | NO/TO | 0...1 | Terms of Use text to be rendered. If 'PreviewDataIDRef' element is present under the 'TermsOfUse' this element SHALL NOT be present. | string |
| AutoSubscribe | E1 | NO/TM | 0...1 | Signals to the terminal whether to automatically subscribe to this service. | boolean |
| PrivateExt | E1 | NO/TO | 0...1 | An element serving as a container for proprietary or application-specific extensions. | |
| <proprietary elements> | E2 | NO/TO | 0...N | Proprietary or application-specific elements that are not defined in this specification. These elements may further contain sub-elements or attributes. | |

In step 415, a service guide including the update service fragment created in the BSDA 402 according to Table 3 is broadcast.

Upon receiving the service guide, the SG-C 408 within the terminal identifies a changed portion in the service guide. Since the service guide includes the update service fragment, the SG-C 408 identifies the update service fragment. According to the indication of the AutoSubscribe element included in the update service fragment, the SG-C 408 requests subscription to the update service to the BSP-M 411 through the BSP-C 407 in step 416.

According to the implementation or business model, the AutoSubscribe element may be omitted, and the terminal 401 having received the update service may be appropriately indicated in order to automatically subscribe to the update service. Through steps 413 to 416 as described above, the terminal is made to automatically subscribe to the update service.

The second stage includes step 417 and corresponds to a stage of performing a security process. After completing step 416, a security process for using the BCAST service is performed in step 417. This stage corresponds to a mechanism that exists in conventional BCAST, and therefore, this stage is not further discussed herein.

The third stage includes steps 418 to 422, and corresponds to a process of broadcasting files for update to terminals. After completing step 417, when the TP-M 410 wants to update firmware of terminals of a particular model, the TP-M 410 requests the SG-SS 409 to create content fragment for firmware files for firmware update in step 418. Upon receiving the request for creation of the content fragment, in step 419, the SG-SS 409 adds a type element value named "Content Fragment" for the present invention to the delivery message used in step 414.

At this time, the delivery message has a type as shown in Tables 4a to 4b below. It is noted that "Content Fragment" has been added to the last row of the Description of the Type element of Table 4b below. Tables 4a to 4b below are divided from one Table for convenience and actually configure a single table.

TABLE 4a

| Name | Type | Category | Cardinality | Description | Data Type |
|---|---|---|---|---|---|
| SGDelivery | E | | | Specifies the delivery message of Service Guide data over interface SG-4 which is used for generating Service Guide in SG-G. Contains the following elements: BSMSelector BSMSelectorID SGData PrivateExt | |
| BSMSelector | E1 | M | 0...N | This element provides the details on the visibility of the enclosed 'SGData'. All the 'BSMSelectorID' values used in the request SHALL have one and only one of these 'BSMSelector' elements instantiated with matching identifier. Element 'BSMSelector' is specified in section 5.4.1.5.2. | complexType |
| BSMSelectorID | E1 | M | 0...N | This element represents constraints on the visibility of the all enclosed 'SGData' elements. This identifier corresponds to the 'id' attribute of the 'BSMSelector' element. See the corresponding description in the 'SGDD' for more details. | anyURI |

TABLE 4a-continued

| Name | Type | Category | Cardinality | Description | Data Type |
|---|---|---|---|---|---|
| SGData | E1 | M | 1...N | Contains source information to be included into the Service Guide. It is RECOMMENDED that the information is delivered in the form of BCAST Service Guide fragments.<br>Contains the following attributes:<br>id<br>transportID<br>version<br>validFrom<br>validTo<br>encoding<br>type<br>Contains the following element:<br>Body | |
| id | A | M | 0...1 | Identifier of the data enclosed in element 'Body'. See also the description of the 'id' attribute in the 'SGDeliveryRes' message. | anyURI |
| transportID | A | O | 0...1 | Transport identifier of the data enclosed is element 'Body'. | unsignedLong |
| version | A | M | 1 | Version of the data enclosed in element 'Body'. | unsignedInt |

TABLE 4b

| validFrom | A | M | 1 | Start time of the validity of the data enclosed in element 'Body'. | unsignedInt |
|---|---|---|---|---|---|
| validTo | A | M | 1 | End time of the validity of the data enclosed in element 'Body'. | unsignedInt |
| encoding | A | M | 1 | Fragment encoding type of the data enclosed in element 'Body'.<br>0 - XML encoded OMA BCAST Service Guide fragment<br>1 - SDP<br>2 - MBMS User Service Bundle Description (MBMS-USBD) as specified in [3GPP TS 26.346] section 5.2.2. It may contain one or more SDP descriptions.<br>3 - AssociatedDeliveryProcedure for File end Stream Distribution as specified in [BCAST10-Distribution] section 5.3.4<br>4 - 127 Reserved for future use<br>128-255 Reserved for proprietary use | unsignedByte |
| type | A | M | 0...1 | Fragment encoding type of the data enclosed in element 'Body'. This SHALL be present and set to one of the values listed below f the 'Body' contains a Service Guide XML fragment and the value of 'encoding' is set to '0'.<br>5 - PurchaseItem Fragment<br>6 - PurchaseData Fragment<br>7 - PurchaseChannel Fragment<br>8 - Terminal Provisioning Service Fragement<br>9 - Content Fragment | unsignedByte |
| Body | E2 | M | 1 | Contains the delivered Service Guide data. The value SHALL be an instance of 'PurchaseItem', 'PurchaseData', 'PurchaseChannel', 'Service' or 'Content' element as specified in 5.1.2.6, 5.1.2.7 and 5.1.2.8 of [BCAST10-SG]. | complexType |
| PrivateExt | E1 | O | 0...1 | An element serving as a container for proprietary or application-specific extensions. | |
| <proprietary elements> | E2 | O | 0...N | Proprietary or application-specific elements that are not defined in this specification. These elements may further contain sub-elements or attributes. | |

Upon receiving the request for creation of a content fragment in step 418, the BSDA 402 either receives a content fragment created according to the definition of the BCAST standard through the Delivery Message or creates the fragment based on the provided information in step 419.

In step 420, the TP-M 410 delivers to firmware file to the BSDA 402. Current BCAST standards do not include a definition on a method of delivering a file between the TP-M 410 and the BSDA 402. However, a method of delivering a file between the BSDA 402 and the BSA 102 is defined, and the same type of delivery is necessary in the process of the present invention, the present invention follows the file delivery method between the BSDA 402 and the BSA 102 defined in the current BCAST standards.

In step 421, the BSDA 402 broadcasts the content fragment created in step 419 to all terminals. In step 422, the BSDA 402 broadcasts the firmware file necessary for the update to all the terminals.

The fourth stage includes steps 423 to 425 and corresponds to a process in which the BSM 403 creates a firmware update command message for terminals of a particular manufacturer and a particular model and broadcasts the created firmware update command message.

That is, in step 423, if performance of a firmware update of terminals of a particular model is determined, the TP-M 410 requests the NTG 412 to create a firmware update notification message. Then, the TP-M 410 delivers information of terminal manufacturer, model, firmware version (FwVersion), and firmware update command, which are objects of the firmware update, to the NTG 412.

Upon receiving the request for creation of the notification message, the NTG 412 creates a notification message as shown in Tables 5a to 5c below.

Tables 5a to 5c below show a configuration of a firmware update command notification message, which is a notification message to which the terminal provisioning has been added. Tables 5a to 5c below are divided from one Table for convenience and actually configure a single table.

TABLE 5a

| Name | Type | Category | Cardinality | Description | Data Type |
| --- | --- | --- | --- | --- | --- |
| Notification Message | E | | | Notification Message<br>Contains the following attributes:<br>id<br>version<br>notificationType<br>eventType<br>validTo<br>Contains the following elements:<br>IDRef<br>Title<br>Description<br>PresentationType<br>Extension<br>SessionInformation<br>MediaInformation<br>SGDD<br>SGDDReference<br>FragmentID<br>AuxDataTrigger<br>PrivateExt<br>    syncopation | |
| SessionInformation | E1 | NM/<br>TM | 0...N | This element SHALL be present when the Notification Message carries pointer to another delivery session, for example for file download or update, SG download or update, or auxiliary data download.<br>SessionInformation defines the delivery session information, transport object identifiers of the objects delivered through the indicated session, and URI as alternative method for delivery over interaction channel. After receiving Notification Message with SessionInformation. Terminal would access the relevant session specified by SessionInformation and take a proper action like receiving contents.<br>Contains the following attributes:<br>validFrom<br>validTo<br>usageType<br>Contains the following elements:<br>DeliverySession<br>AlternativeURI<br>Relatively long-lived auxiliary data associated with this Notification Message SHOULD be scheduled for distribution using the Service Guide. On the other hand, dynamic updates of auxiliary data MAY be delivered on the delivery session referenced by this SessionInformation. | |
| validFrom | A | NM/<br>TM | 0...1 | The first moment when the session for terminal to receive data is valid. This field expressed as the first 32 bits integer part of NTP time stamps. | unsignedInt |

TABLE 5b

| validTo | A | NM/<br>TM | 0...1 | The last moment when the session for terminal to receive data is valid. This field expressed as the first 32 bits integer part of NTP time stamps. | unsignedInt |
| --- | --- | --- | --- | --- | --- |
| usageType | A | NM/<br>TM | 0...1 | Defines the type of the object transmitted through the indicated delivery session. Allowed values are:<br>0 - unspecified<br>1 - files<br>2 - streams<br>3 - SGDD only<br>4 - mixed SGDD and SGDU<br>5 - notification<br>6 - TP command | unsignedByte |

TABLE 5b-continued

| | | | | | |
|---|---|---|---|---|---|
| | | | | 7-127 reserved for future use<br>128-255 reserved for proprietary use<br>Note: the delivery session only carrying SGDUs is declared through "SGDD" element or "SGDDReference" element in this Notification Message.<br>Default: 0 | |
| Delivery Session | E2 | NM/TM | 0 ... 1 | Target delivery session information indicated by the Notification Message.<br>Contains the following attributes:<br>ipAddress<br>port<br>sourceIP<br>transmissionSessionID<br>Contains the following element:<br>TransportObjectID | |
| ipAddress | A | NM/TM | 1 | Destination IP address of the target delivery session | string |
| port | A | NM/TM | 1 | Destination port of target delivery session | unsignedShort |
| sourceIP | A | NM/TM | 0 ... 1 | Source IP address of the delivery session | string |
| transmission SessionID | A | NM/TM | 1 | This is the Transmission Session Identifier (TSI) of the session at ALC/LCT level. | unsignedShort |
| Transport ObjectID | E3 | NM/TM | 0 ... N | The transport object ID (TOI) of the object transmitted through the indicated delivery session | positiveInteger |

TABLE 5c

| | | | | | |
|---|---|---|---|---|---|
| AlternativeURI | E2 | NM/TM | 0 ... 1 | Alternative URI for receiving the object via the interaction channel. If terminal cannot access the indicated delivery session, the terminal can receive the objects associated with the Notification Message by AlternativeURI.<br>syncopation | anyURI |
| TerminalProvisioning | E1 | NO/TM | 0 ... 1 | Terminal Provisioning specific information<br>Consists of the following elements:<br>Manufacturer<br>Model<br>FwVersion<br>Command | |
| Manufacturer | E2 | NO/TM | 0 ... 1 | Terminal manufacturer ID. The terminal manufacturer ID must be recognizable by the terminal. | string |
| Model | E2 | NO/TM | 0 ... 1 | Terminal model ID. The terminal model ID must be recognizable by the terminal | string |
| FwVersion | E2 | NO/TM | 0 ... 1 | Firmware version number. The terminal must recognize the firmware version | string |
| Command | E2 | NO/TM | 0 ... 1 | Firmware update command. Adheres to OMA DM firmware update commands | string |
| PrivateExt | E1 | NO/TO | 0 ... 1 | An element serving as a container for proprietary or application-specific extensions. | |
| <proprietary elements> | E2 | NO/TO | 0 ... N | Proprietary or application-specific elements that are not defined in this specification. These elements may further contain sub-elements or attributes. | |

It is noted from Table 5c that an element named "Terminal Provisioning" has been added to the firmware update command notification message and corresponding sub-elements "manufacturer", "model", "fwVersion", and "command" have been added to the message.

The manufacture element has a value for identifying a terminal manufacturer to be subjected to the firmware update, and the model element has a value for identifying the terminal model. The fwVersion element indicates a firmware version provided for the firmware upgrade. The Command element corresponds to an update command necessary for the firmware update and follows the OMA DM standards. Further, the command element may use a hash function, such as MD5, in order to guarantee flawlessness when necessary.

The elements of manufacturer, model, and fwVersion are filtering elements used for filtering the firmware of the terminal. The terminal can update the firmware by filtering the firmware corresponding to the terminal itself by using the elements of manufacturer, model, and fwVersion.

Other elements of the notification message have values following the OMA-TS-BCAST_Services-V1_0-20080312-D, which is an existing BCAST standard document. Among the other elements, an item of No. 66 as in Table 6 below is added as an item possible as the eventType element, and the session information includes information on the firmware file broadcasted through step 422.

TABLE 6

| EventType | Name | Description |
|---|---|---|
| 0 | Unspecified notification | |
| | | 1-63: User oriented notifications |
| 1 | Emergency notification | To announce emergency messages to users. |
| 2 | SG download or update notification | To announce download or update of SGDD or SG fragments |
| 3 | File download or update notification | To announce download or update of normal files such as movie, music, software, etc. |
| 4 | Service availability notification | To announce the errors, problems or interruption of broadcast main services or contents. To announce the abrupt schedule changes of broadcast main service or content To announce the abrupt changes on access entry point of broadcast main service or content |
| 5 | Supplemental service notification | To announce service supplemental information that is a part of service experience (such as news, sports scores, promotional events etc.) |
| 6 | Roaming support notification | To announce the information about services available in neighbouring systems, providing roaming support |
| 7-63 | For future use | |
| | | 64-127: Terminal oriented notifications |
| 64 | Auxiliary Data Trigger for Real-time main contents | To trigger either the auxiliary data downloading and storage, or the auxiliary data insertion, associated with the real-time main service or content. This notification may be associated with filtering related data to support customization of the auxiliary data storage or insertion. |
| 65 | Auxiliary Data Trigger for Non-Real-time main contents | To trigger either the auxiliary data downloading and storage, or the auxiliary data insertion, associated with the non-real-time main service content. This notification may be associated with filtering related data to support customization of the auxiliary data storage or insertion. |
| 66 | Terminal Provisioning Firmware Update Command | To trigger and execute firmware update for specific terminals. The firmware file is distributed through file distribution while the update command and retrieval parameters are provided via this notification |
| 67-127 | For future use | |
| 128-255 | For proprietary use | |

Thereafter, the NTG 412 delivers the firmware update notification message created in step 424 to the BSDA 402. In step 425, the BSDA 402 broadcasts the firmware update command notification message to the terminals.

The fifth stage includes steps 426 to 429 and corresponds to a process in which the terminal determines whether the firmware update is necessary and performs the firmware update.

Upon receiving the firmware update command notification message, the terminal 401 checks the terminal provisioning element of the firmware update command notification message in step 426. The checking is performed by the NTC 401 of the terminal, wherein the TPC 406 checks the manufacturer, model, and the Firmware Version (FwVersion), from among the terminal provisioning elements added according to the present invention. When the manufacturer and the model are a corresponding manufacturer and model and the checked firmware version is newer than the current firmware version installed in the terminal, the TPC 406 determines that a firmware update will be performed, extracts a DM command, which is a content of the command element in the firmware update command notification message received in step 425, and delivers the firmware update command to the FD-C 405.

Then, in step 427, the NTC 406 acquires the firmware file broadcasted in step 422 and delivers the acquired firmware file to the FD-C 405.

In step 428, the FD-C 405 delivers the received firmware update command and firmware file to the TP-C 404. In step 429, the TP-C 404 performs firmware update. Meanwhile, when necessary, the TP-C 404 may send a firmware update success message to the TP-M 410 of the BSM 403. When a hash function, such as MD5, is applied to the Command element in order to support the flawlessness, the hash should be processed before extraction of the command.

Although the above description deals with embodiments of firmware update of a terminal, the present invention is applicable to cases where updating typical software other than firmware, in the case of a system providing a terminal provisioning service.

According to the present invention, it is possible to reduce the overhead of individual upgrade of the firmware of each terminal in the prior art, and it is possible to simultaneously update the firmware of multiple terminals through broadcast. Therefore, the present invention has a more efficient firmware update effect. According to the present invention, since it is possible to simultaneously update the firmware of the same type of terminals in a network, the network can effectively manage resources and optimally manage the performance of the terminals.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of updating software of a terminal in a mobile broadcast system, the method comprising the steps of:
   creating, by a BroadCAST (BCAST) Subscription Management (BSM), an update command for the terminal, the update command including update information;
   delivering the update command, by the BSM, to a Broadcast Service Distribution System (BSDA); and
   broadcasting, by the BSDA, the update command.

2. The method of claim 1, wherein the update information comprises software version information and at least one of terminal manufacturer information and terminal model information.

3. The method of claim 1, further comprising, before broadcasting the update command:
- creating, by the BSM, an update package;
- delivering the update package to the BSDA; and
- broadcasting, by the BSDA, the update package to the terminal.

4. The method of claim 1, wherein the software includes firmware of the terminal.

5. The method of claim 1, wherein the update command is included in a notification message.

6. The method of claim 3, further comprising controlling the terminal to subscribe to an automatic update service, before creating the update package.

7. A method of updating software in a terminal of a mobile broadcast system, the method comprising the steps of:
- receiving, by the terminal, an update command for terminals through a broadcast, the update command including update information; and
- performing, by the terminal, a software update based on the update command.

8. The method of claim 7, wherein the update information comprises software version information and at least one of terminal manufacturer information and terminal model information.

9. The method of claim 7, further comprising receiving an update package from a network, before receiving the update command through the broadcast.

10. The method of claim 7, wherein the software includes firmware of the terminal.

11. The method of claim 7, wherein the update command is included in a notification message.

12. The method of claim 9, further comprising subscribing to an automatic update service, before receiving the update package.

13. A network apparatus for updating software of a terminal in a mobile broadcast system, the network apparatus comprising:
- a BroadCAST (BCAST) Subscription Management (BSM) for transmitting an update command for the terminal to a Broadcast Service Distribution System (BSDA), the update command including update information; and
- the BSDA for receiving and broadcasting the update command.

14. The network apparatus of claim 13, wherein the update information comprises software version information and at least one of terminal manufacturer information and terminal model information.

15. The network apparatus of claim 13, wherein the BSM comprises:
- a Terminal Provisioning-Management (TP-M) for sending a request for creation of an update notification message; and
- a NoTification-Generation (NTG) for creating the update notification message in response to the update notification message creation request from the TP-M and transmitting the created update notification message to the BSDA.

16. The network apparatus of claim 13, wherein the BSM comprises a Service Guide-Subscription Source (SG-SS) and a Terminal Provisioning-Management (TP-M) for sending a request, to the SG-SS, for creation of an update service,
- wherein the SG-SS creates an update service fragment creation request message including information necessary for creation of an update service fragment in response to the update service creation request from the TP-M and transmits the created update service fragment creation request message to the BSDA, and
- wherein the BSDA creates and broadcasts the update service fragment including an update service auto-subscription command according to the information necessary for creation of the update service fragment.

17. The network apparatus of claim 13, wherein the software includes firmware of the terminal.

18. The apparatus of claim 13, wherein the BSM delivers an update package to the BSDA, and
- wherein the BSDA broadcasts the update package for the terminal, before transmitting the update command.

19. The apparatus of claim 13, wherein the update command is included in a notification message.

20. An apparatus for software update in a terminal of a mobile broadcast system, wherein the apparatus receives,
- an update command through a broadcast and performs a software update based on the update command,
- wherein the update command including update information.

21. The apparatus of claim 20, wherein the update information comprises software version information and at least one of terminal manufacturer information and terminal model information.

22. The apparatus of claim 20, further comprising:
- a Service Guide-Client (SG-C) for receiving an update service guide for auto-subscription; and
- a BCAST Service Provisioning-Client (BSP-C) for subscribing to an automatic update service according to the update service guide.

23. The apparatus of claim 20, wherein the software includes firmware of the terminal.

24. The apparatus of claim 20, wherein the update command is included in a notification message.

25. The apparatus of claim 20, comprising:
- a NoTification-Client (NTC) for receiving the update command through the broadcast;
- a File Delivery-Client (FD-C) for receiving an update package; and
- a Terminal Provisioning-Client (TP-C) for performing the software update based on the update command.

* * * * *

UNITED STATES PATENT AND TRADEMARK OFFICE
CERTIFICATE OF CORRECTION

PATENT NO. : 8,396,464 B2 Page 1 of 1
APPLICATION NO. : 12/414294
DATED : March 12, 2013
INVENTOR(S) : Jong-Hyo Lee et al.

It is certified that error appears in the above-identified patent and that said Letters Patent is hereby corrected as shown below:

In the Claims:

In Claim 1, column 22, lines 61-62, "Broadcast Service Distribution System (BSDA)" should be --BroadCAST (BCAST) Service Distribution/Adaptation (BSD/A)--; and on line 63, "BSDA" should be --BSD/A--.

In Claim 3, column 23, lines 4 and 5, each occurrence of "BSDA" should be --BSD/A--.

In Claim 13, column 23, lines 40-41, "Broadcast Service Distribution System (BSDA)" should be --BroadCAST (BCAST) Service Distribution/Adaptation (BSD/A)--; and on line 43, "BSDA" should be --BSD/A--.

In Claim 16, column 24, lines 13 and 14, each occurrence of "BSDA" should be --BSD/A--.

In Claim 18, column 24, lines 21 and 22, each occurrence of "BSDA" should be --BSD/A--.

Signed and Sealed this
Twenty-ninth Day of October, 2013

Teresa Stanek Rea
*Deputy Director of the United States Patent and Trademark Office*